United States Patent [19]

Sommer

[11] Patent Number: 4,460,075
[45] Date of Patent: Jul. 17, 1984

[54] REVERSING DRIVE UNIT

[75] Inventor: Gordon M. Sommer, Boca Raton, Fla.

[73] Assignee: Sommer Co., Warren, Mich.

[21] Appl. No.: 381,585

[22] Filed: May 24, 1982

[51] Int. Cl.³ .................. F16D 67/02; F16D 19/00; F16D 21/04; F16H 3/14
[52] U.S. Cl. .................. 192/18 A; 192/21; 192/87.16; 74/355; 74/404; 74/378
[58] Field of Search ............. 192/18 A, 87.14, 87.15, 192/87.16, 48.9, 48.91, 21, 51; 74/347, 355, 321, 324, 318, 319, 70, 416, 417, 423, 335, 404, 202, 378

[56] References Cited

U.S. PATENT DOCUMENTS

| | | | |
|---|---|---|---|
| 1,063,874 | 6/1913 | Hall | 74/355 |
| 1,205,720 | 11/1916 | Edens | 74/355 |
| 1,253,634 | 1/1918 | Schwanke | 74/355 |
| 1,355,346 | 10/1920 | Mills | 74/355 |
| 1,410,617 | 3/1922 | Starks | 74/355 |
| 1,415,673 | 5/1922 | Mills | 74/355 |
| 1,619,702 | 3/1927 | Chorlton | 74/355 |
| 1,664,209 | 3/1928 | Guernsey | 74/355 |
| 1,875,487 | 9/1932 | Perkins et al. | 74/355 |
| 2,190,856 | 2/1940 | Young | 74/355 |
| 2,441,543 | 5/1948 | Longfield | 192/18 A |
| 2,583,250 | 1/1952 | Ball | 74/355 |
| 3,481,213 | 12/1969 | Macchia | 74/202 |
| 3,696,898 | 10/1972 | Sommer | 192/58 C X |
| 3,713,517 | 1/1973 | Sommer | 192/18 A |

Primary Examiner—Allan D. Herrmann
Assistant Examiner—Stephen B. Andrews
Attorney, Agent, or Firm—Harness, Dickey & Pierce

[57] ABSTRACT

A reversing drive unit used in association with a clutch/brake unit and a motor driven in only one direction comprising a first shaft, a housing around at least a portion of the shaft with a second shaft extending from a position interior the housing to a position exterior of the housing, a gear disposed at the end of the second shaft engageable with one or the other of a first and second annular gears disposed on and coaxially encircling the axis of the first shaft, and a mechanism to engage one or the other of the annular gears, with the second shaft gear moving the gears between a first position for affecting engagement of the first annular gear with the second shaft gear to provide relative rotation between the second shaft and the first shaft in one direction and a second position for affecting engagement of the second annular gear with the second shaft gear to provide relative rotation between the second shaft and the first shaft in a second direction opposite to said first direction.

6 Claims, 1 Drawing Figure

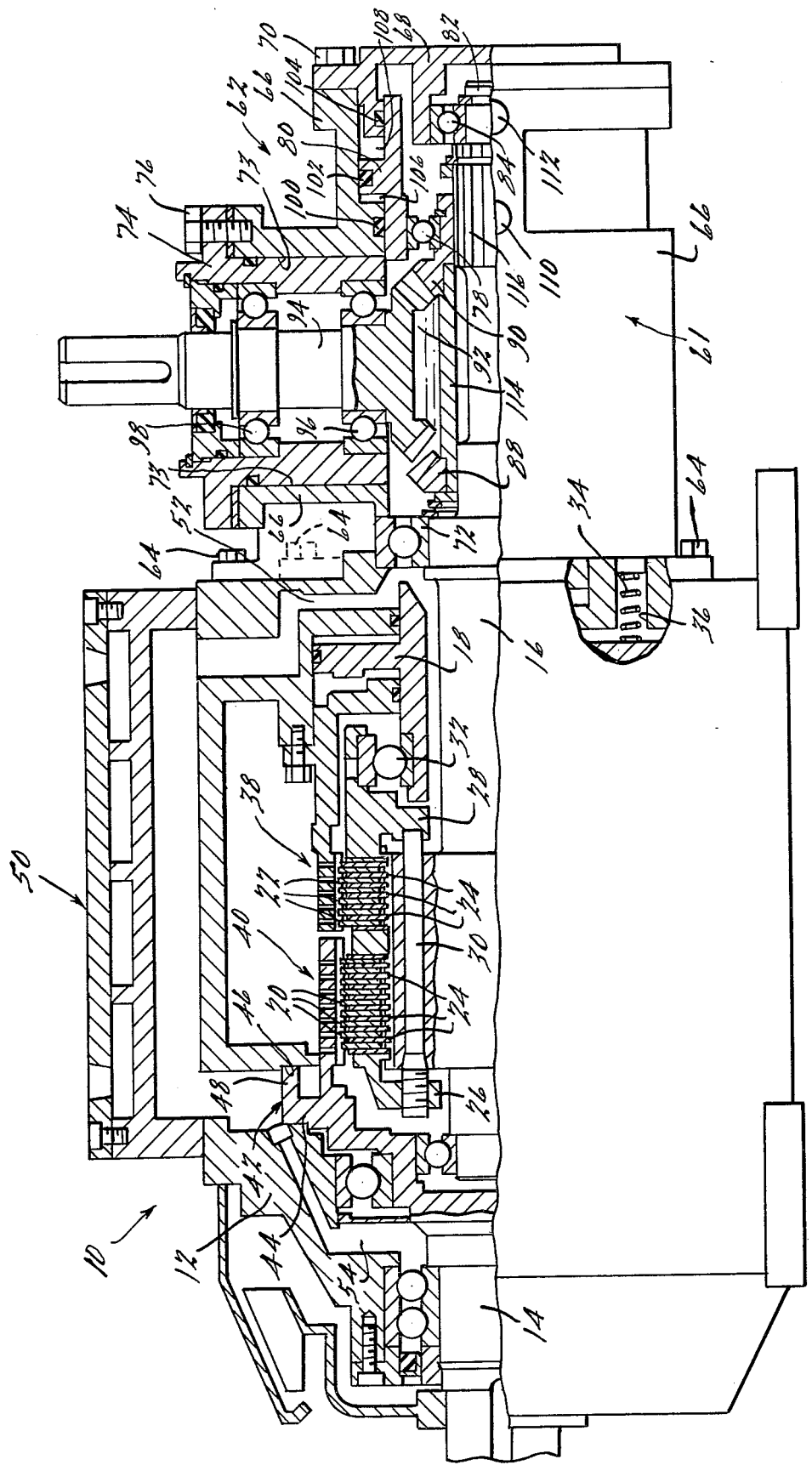

REVERSING DRIVE UNIT

BACKGROUND AND SUMMARY OF THE INVENTION

This invention relates generally to clutch/brake units and in particular to a reversing drive mechanism for the output shaft of a clutch/brake unit.

In prior art clutch/brake units, in order to have a reversing drive feature permitting the output shaft to be driven in either direction of rotation, an expensive reversing motor was necessary. The present invention eliminates the need for the expensive reversing motor and allows less expensive single direction of rotation drive motors to be attached to the input shaft while the output shaft is driven in either direction of rotation, with reversible direction of either the input or output shafts. This single direction of rotation further permits the vanes of any oil pumping device driven by any of the shafts of the units to be articulated or curved in one direction to improve the pumping capability of the pump.

The present invention further has the object of a heavy duty capability and quick response to change of direction by pneumatic controls. The present invention also has the further object of the capability of mounting the output shaft right-handed, left-handed or at any angular relationship with regard to the clutch/brake shaft and in any radial direction from that shaft.

Additional objects and advantages can be seen in the following specification and claims and attached drawings.

BRIEF DESCRIPTION OF THE DRAWINGS

FIG. 1 is a side sectional view of the clutch/brake unit and reversing drive unit of the present invention.

DETAILED DESCRIPTION OF THE PREFERRED EMBODIMENTS

Referring to FIG. 1, a clutch/brake unit 10 is illustrated similar to that described in applicant's U.S. Pat. No. 3,698,898, issued Oct. 10, 1972. The clutch/brake unit 10 is comprised of a housing 12, axially aligned input shaft 14 and main drive shaft 16 mounted in the housing 12, a non-rotatable pneumatically actuated piston 18 in the housing 12, a series of radially disposed clutch plates 20 mounted for rotation with the input shaft 14, a series of radially disposed brake plates 22 spaced axially from the clutch plates 20 and non-rotatably attached to the housing 12, a series of friction discs 24 mounted on the main drive shaft 16 for rotation therewith and adapted for selective frictional engagement with the clutch 20 and brake 22 plates, a clutch actuating member 26 and a brake actuating member 28 carried on the main drive shaft 16 adjacent the clutch 20 and brake 22 plates, securement bolts 30 extending between the last two members 26 and 28, whereby the members 26 and 28 are movable together axially of the main drive shaft 16, and a bearing 32 disposed between the piston 18 and the brake actuating member 28, through which the piston 18 drives the clutch 26 and brake 28 actuating members. Movement of the piston 18 in one direction serves to simultaneously frictionally engage the clutch plates 20 with certain of the friction discs 24 and to release the remaining friction discs 24 from frictional engagement with the brake plates 22, and movement of the piston 18 in the other direction serves to simultaneously release the clutch plates 20 from the frictional engagement with certain friction discs 24 and to frictionally engage the remaining friction discs 24 with the brake plates 22. Springs 34 are mounted in recesses 36 at one end of the housing 12 to normally urge the piston 18 toward a position wherein the springs 34 effect engagement of the brake 38 and release of the clutch 40. A pumping mechanism 42 is disposed on the input shaft 14 having a centrifugal pump 44 rotatable with the shaft 14 in an annular chamber 46. The pump 44 has vanes 48 at the outer periphery thereof to direct the fluid into an oil cooler 50 and other passageways 52, 54 of the oil delivery system of the clutch/brake unit 10. The vanes 48 may be curved in one direction (usually the direction of rotation) since the pump 44 will rotate in only one direction.

The main drive shaft 16 extends into a second housing 61 for the reversing drive mechanism 62 fixedly secured to the clutch/brake housing 12 by series of circumferentially spaced bolts 64. The housing 61 is comprised of an annular sidewall 66 and an end portion 68 secured to the sidewall by a series of circumferentially spaced bolts 70. The annular housing sidewall 66 includes bearings 72 for the main drive shaft 16. The annular housing sidewall 66 has an aperture 73 therein through which an extended, radially outwardly directed housing portion 74 is inserted in and secured to the housing sidewall 66 by series of circumferentially spaced bolts 76. The annular housing sidewall 66 further comprises bearings 78 at an intermediate location of the output shaft 16 secured to the annular housing sidewall 66 via a piston 80. The driving end 82 of the main drive shaft 16 is secured in bearings 84 fixedly secured by the end portion 70. The main drive shaft 16 has a pair of annular beveled gears 88 and 90 disposed to face one another at spaced apart locations. The gears 88 and 90 are spaced apart far enough so that a beveled pinion gear 92 may engage only one or the other when disposed at right angles thereto. The beveled pinion gear 92 is disposed on the output shaft 94 of the reversing drive unit 62, which output shaft 94 is rotatably secured within the extended housing portion 68 by bearings 96 and 98.

The piston 80 is sealingly engaged with the annular housing sidewall 66 by seals 100, 102, and 104 to provide two annular chambers 106 and 108. Chambers 106 and 108 communicate with ports 110 and 112 respectively. As air is alternatively fed to one of the two ports 110, 112, the piston 80 is forced in one direction or the other. The spaced apart beveled gears 88, 90 on the main drive shaft 16 are secured together by an intermediate portion 114 which is slidably disposed on splines 116 integral with the main drive shaft 16, which intermediate portion 114 is driven by the piston 80. Thus, the direction of rotation is determined by which of the two ports 110 or 112 is fed compressed air to force the intermediate portion 114 (and gears 88 and 90) to the right or to the left (as illustrated) and engage the respective annular gear 88, 90 to rotate the beveled pinion gear 92 and shaft 94 in one direction or the other relative to the single direction that the main drive shaft 16 is rotated.

It can be also clearly seen from the above disclosure that the reversing drive mechanism 62 may be operably associated between a drive motor and an extended input shaft 14 of the clutch/brake unit 10.

While it will be apparent that the preferred embodiment illustrated herein is well calculated to fulfill the object above stated, it will be appreciated that the present invention is susceptible to modification, variation and change without departing from the proper scope or fair meaning of the subjoined claims.

I claim:

1. A reversing drive unit driven by motor means rotatable to drive said unit in only one direction, comprising a first housing defining a central cavity between opposed longitudinal spaced end walls;

a main shaft extending coaxially through said opposed spaced end walls and comprising first and second coaxially arranged shaft sections, one of said shaft sections having an axially extended shaft portion directed outwardly away from the associated end wall of said first housing;

clutch means within said housing for engaging said first and second shaft sections;

brake means within said housing for stopping the rotation of at least one of said shaft sections;

means for alternately actuating said clutch means or said brake means;

a second housing around at least a portion of said extended portion of said main shaft and secured to said first housing, said second housing having at least one sidewall and having an opening in said sidewall;

a second shaft extending from a position interior to said second housing through said opening, having gear means operably secured to the end of said second shaft disposed within said second housing;

first and second gear means disposed coaxially with and connected to said axially extended shaft portion of said main shaft; and sleeve support means integrally secured to both said first and second gear means for alternately engaging said first or second gear means with said said second shaft means wherein said first and second gear means are movable between a first position for effecting engagement of said first gear means with said third shaft gear means to provide relative rotation between said third shaft and said main shaft in a first direction and a second position for effecting engagement of said second gear means with said third shaft gear means to provide relative rotation between said third shaft and said main shaft in a second direction opposite to said first direction, said sleeve support means comprising means for guiding said sleeve support means to provide axial relative movement between said main shaft and said sleeve support means, means for transmitting forces between said main shaft and said sleeve support means, and bearing means for said main shaft operably associated with said sleeve support means.

2. A unit in accordance with claim 1, wherein said motor means drives said main shaft.

3. A unit in accordance with claim 1, wherein said motor means drives said third shaft.

4. A unit in accordance with claim 1, wherein said first and second housings comprise one integral housing.

5. A reversing drive unit driven by motor means rotatable to drive said unit in only one direction, comprising:

a first housing defining a central cavity between opposed longitudinally spaced end walls, one of said end walls having a plurality of circumferentially spaced, axially extending bores;

a main shaft extending coaxially through said opposed spaced end walls and comprising first and second coaxially arranged shaft sections, one of said shaft sections having an axially extended portion directed outwardly away from the associated end wall of said first housing;

a series of radially disposed clutch plates mounted in said cavity for rotation with said first shaft section;

a series of radially disposed brake plates spaced axially from said clutch plates and non-rotatably disposed in said cavity;

a series of friction discs mounted on said second shaft section for rotation therewith and adapted for selective frictional engagement with said clutch and brake plates;

clutch and brake actuating members located on axially opposite sides of said friction discs and movable axially of said shaft sections, with movement thereof in one direction serving simultaneously to frictionally engage said clutch plates with certain of said friction discs and to release the remaining friction discs from frictional engagement with said brake plates and with movement thereof in the other direction serving simultaneously to release said clutch plates from said frictional engagement with said certain friction discs and to frictionally engage said remaining friction discs with said brake plates;

a non-rotatable first piston member disposed in said first housing coaxial of said main shaft and movable between first and second positions for effecting axial movement of said actuating members;

spring means for locating in said plurality of circumferentially spaced, axially extending bores for urging said first piston member toward one of said positions;

a second housing encapsulating at least a portion of said extended portion of said main shaft and secured to said first housing, said second housing having at least one side wall and one end wall, an opening in said sidewall, and a second end portion disposed across said opening and secured to said sidewall;

a second shaft extending from a position interior to said second housing through said second end portion of said second housing, having gear means operably secured at the end of said second shaft disposed within said second housing;

first and second gear means slidably disposed coaxially with said extended shaft portion of said main shaft alternately engageable with said second shaft gear means;

double-sided, double acting non-rotatable annular second piston means disposed in said second housing coaxially of said extended shaft portion, and movable between a first position for effecting engagement of said first gear means with said second shaft gear means to rotate said second shaft in a first direction relative to rotation of said first and second shaft sections and a second position for effecting engagement of said second gear means with said second shaft gear means to rotate said second shaft in a second direction relative to rotation of said first and second shaft sections opposite to said first direction of rotation, said piston means comprising an annular piston member, an annular sleeve disposed around and slideable axially of said main shaft, means for guiding movement of said sleeve on said main shaft, means for transmitting forces from said main shaft to said sleeve, bearing means for rotatably supporting said main shaft disposed between said piston member and said sleeve, wherein said piston means is interrelated with said housing and said main shaft to provide a compact yet functional unit; and means for communicating a pressure media alternately to one side or the other of said annular second piston member to obtain the desired direction of rotation of said second shaft.

6. A reversing drive unit driven by motor means rotatable to drive said unit in only one direction, comprising a first housing defining a central cavity between opposed longitudinal spaced end walls;

a main shaft extending coaxially through said opposed spaced end walls and comprising first and second coaxially arranged shaft sections, one of said shaft sections having an axially extended shaft portion directed outwardly away from the associated end wall of said first housing;

clutch means within said housing for engaging said first and second shaft sections;

brake means within said housing for stopping the rotation of at least one of said shaft sections;

means for alternately actuating said clutch means or said brake means;

a second housing around at least a portion of said extended portion of said main shaft and secured to said first housing, said second housing having at least one sidewall and having an opening in said sidewall;

a second shaft extending from a position interior to said second housing through said opening, having gear means operably secured to the end of said second shaft disposed within said second housing;

first and second gear means disposed coaxially with and connected to said axially extended shaft portion of said main shaft; and means for alternately engaging said first or second gear means with said second shaft gear means wherein said first and second gear means are movable between a first position for effecting engagement of said first gear means with said second shaft gear means to provide relative rotation between said second shaft and said main shaft in a first direction and a second position for effecting engagement of said second gear means with said second shaft gear means to provide relative rotation between said second shaft and said main shaft in a second direction opposite to said first direction, comprising sleeve support means for both said first and second gear means integrally interconnecting said first and second gear means, said sleeve support means disposed around said main shaft within said second housing being slideable axially of said main shaft, and means for guiding the axial movement of said support means which also comprises means for transmitting forces between said support means and said main shaft, said sleeve support means further comprising bearing means for said main shaft disposed radially outwardly of said sleeve support means.

* * * * *